United States Patent
Adams et al.

(10) Patent No.: US 10,869,274 B2
(45) Date of Patent: Dec. 15, 2020

(54) METHOD AND APPARATUS FOR AVOIDING INTERFERENCE BETWEEN WIFI OPERATION AND MICROWAVE OVEN OPERATION

(71) Applicant: MediaTek Singapore Pte. Ltd., Singapore (SG)

(72) Inventors: Lewis Adams, Carmel, CA (US); Yasantha Rajakarunanayake, San Jose, CA (US); Pedro T. Tsai, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/402,184

(22) Filed: May 2, 2019

(65) Prior Publication Data
US 2020/0351787 A1 Nov. 5, 2020

(51) Int. Cl.
| | |
|---|---|
| *H04W 52/02* | (2009.01) |
| *H05B 6/66* | (2006.01) |
| *H05B 6/68* | (2006.01) |
| *H04W 24/04* | (2009.01) |

(52) U.S. Cl.
CPC ....... *H04W 52/0238* (2013.01); *H04W 24/04* (2013.01); *H05B 6/664* (2013.01); *H05B 6/668* (2013.01); *H05B 6/687* (2013.01)

(58) Field of Classification Search
CPC .. H04W 52/0238; H04W 24/04; H05B 6/664; H05B 6/668; H05B 6/687
See application file for complete search history.

(56) References Cited

U.S. PATENT DOCUMENTS

| | | | | |
|---|---|---|---|---|
| 6,006,071 | A  * | 12/1999 | Roberts | H04B 15/00 455/403 |
| 6,711,380 | B1 * | 3/2004 | Callaway, Jr. | H04B 1/1027 219/702 |
| 8,184,658 | B1 * | 5/2012 | Chowdhuri | H04W 74/04 370/466 |
| 9,491,770 | B1 | 11/2016 | Heninwolf | |
| 10,477,585 | B1 * | 11/2019 | Tsai | H04W 74/0816 |
| 2006/0068715 | A1 * | 3/2006 | Hundal | H04L 1/08 455/67.11 |
| 2007/0194011 | A1 * | 8/2007 | McFadden | H05B 6/708 219/681 |

(Continued)

FOREIGN PATENT DOCUMENTS

EP 0935347 A2 8/1999

OTHER PUBLICATIONS

European Patent Office, Communication regarding European Patent Application No. 19190266.7, dated Feb. 18, 2020.

*Primary Examiner* — Md K Talukder
(74) *Attorney, Agent, or Firm* — Han IP PLLC; Andy M. Han (57) ABSTRACT

Examples and techniques pertaining to avoidance of interference between wireless operation and microwave oven operation are described. A processor configures at least one of a magnetron of a microwave oven or a wireless transceiver of the microwave oven. The processor then controls operations of the magnetron and the wireless transceiver such that wireless communication by the wireless transceiver is not interfered by radiation from the magnetron as a result of the configuring.

16 Claims, 4 Drawing Sheets

(56) References Cited

U.S. PATENT DOCUMENTS

| | | | |
|---|---|---|---|
| 2008/0146156 A1* | 6/2008 | Makhlouf | H04W 74/0808 455/63.1 |
| 2011/0249598 A1* | 10/2011 | Horvat | H04B 7/2656 370/280 |
| 2012/0140839 A1* | 6/2012 | Yoshikawa | H04L 27/10 375/285 |
| 2013/0008893 A1 | 1/2013 | Little et al. | |
| 2015/0111610 A1 | 4/2015 | Hwang et al. | |
| 2015/0200694 A1 | 7/2015 | Orlik et al. | |
| 2017/0273019 A1* | 9/2017 | Park | H04W 84/12 |
| 2018/0220500 A1* | 8/2018 | Staton | H05B 6/688 |

* cited by examiner

METHOD AND APPARATUS FOR AVOIDING INTERFERENCE BETWEEN WIFI OPERATION AND MICROWAVE OVEN OPERATION

TECHNICAL FIELD

The present disclosure is generally related to wireless interference and, more particularly, to avoidance of interference between wireless operation and microwave oven operation.

BACKGROUND

Unless otherwise indicated herein, approaches described in this section are not prior art to the claims listed below and are not admitted to be prior art by inclusion in this section.

A smart appliance is a machine or apparatus designed for a specific function and is equipped with a built-in computer and network connectivity that allows the smart appliance to communicate with a network and/or one or more other smart appliances in a smart home. For instance, a smart kitchen appliance may be capable of wireless communications via WiFi in accordance with the Institute of Electrical and Electronics Engineers (IEEE) 802.11 specifications. There is, however, a potential for radio frequency (RF) interference with WiFi operation (e.g., in 2.4 GHz). Take a wireless-enabled microwave oven capable of wireless communications (e.g., WiFi) as an example, the Federal standard (21 CFR 1030.10) limits the amount of microwaves that can leak from the wireless-enabled microwave oven throughout its lifetime to 5 milliwatts (mW) of microwave radiation per square centimeter at approximately two inches from the oven surface, meaning 7 dBm is allowed. Thus, the WiFi antenna of the wireless-enabled microwave oven could suffer serious degradation in antenna sensitivity, or antenna desense, when a magnetron of the wireless-enabled microwave oven is in operation. Traditional approaches to addressing this issue usually involve moving the antennae or adding shielding to the microwave. However, such approaches tend to be costly and do not resolve the issue completely.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor configuring at least one of a magnetron of a microwave oven or a wireless transceiver of an appliance. The method may also involve the processor controlling operations of the magnetron and the wireless transceiver such that wireless communication by the wireless transceiver is not interfered by radiation from the magnetron as a result of the configuring.

In another aspect, an apparatus may include a wireless transceiver and a processor coupled to the wireless transceiver. During operation, the wireless transceiver may wirelessly transmit and receive data. The processor may configure at least one of a magnetron of a microwave oven or the wireless transceiver. The processor may also control operations of the magnetron and the wireless transceiver such that wireless communication by the wireless transceiver is not interfered by radiation from the magnetron as a result of the configuring.

It is noteworthy that, although description provided herein may be in the context of certain smart appliances, machines or apparatus such as wireless-enabled microwave ovens, the proposed concepts, schemes and any variation(s)/derivative(s) thereof may be implemented in, for and by other smart appliances, machines or apparatus such as, for example and without limitation, wireless-enabled rice cookers, wireless-enabled refrigerators and other wireless-enabled appliances. Moreover, although description provided herein may be in the context of certain RF technologies such as WiFi and microwave radiation, the proposed concepts, schemes and any variation(s)/derivative(s) thereof may also be applicable to other RF technologies such as Bluetooth and Bluetooth Low Energy (BLE), for example. Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
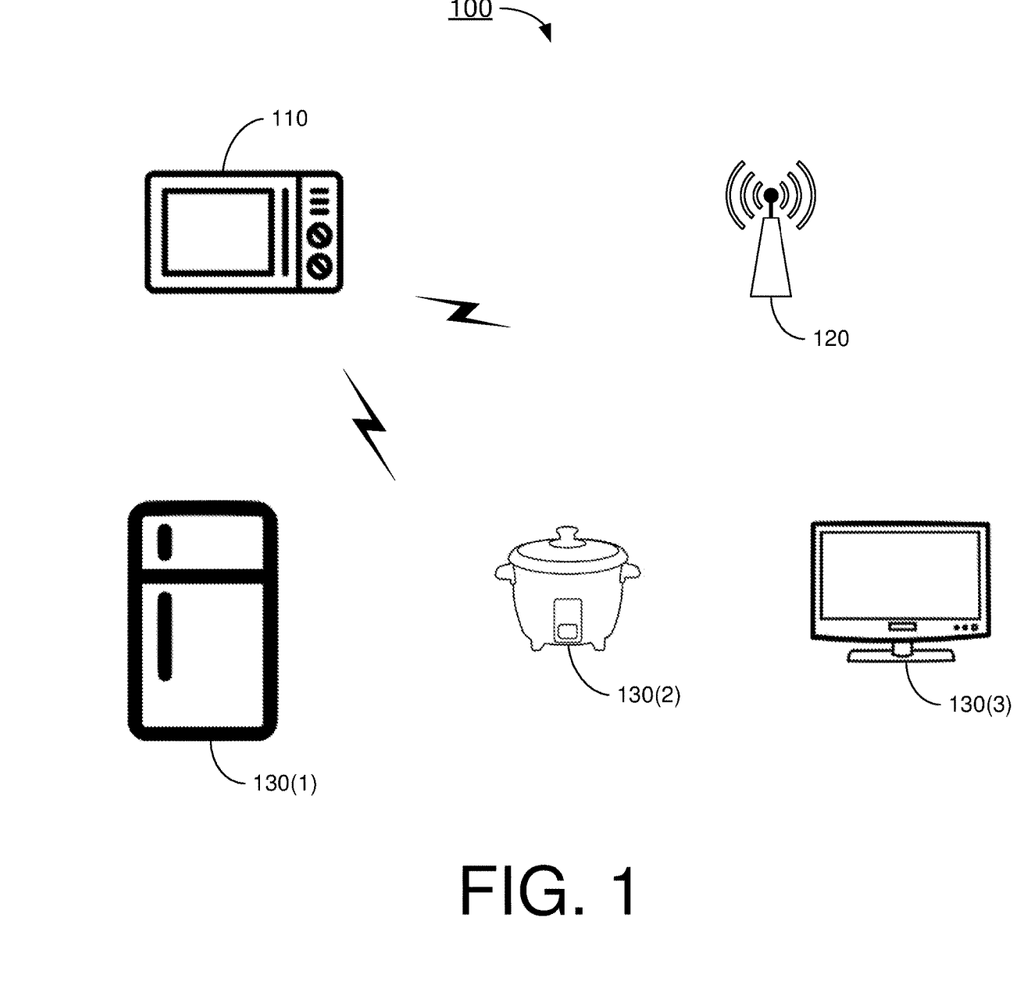
FIG. 1 is a diagram of an example environment in which various proposed schemes in accordance with the present disclosure may be implemented.

FIG. 1 illustrates an example environment 100 in which various proposed schemes in accordance with the present disclosure may be implemented. Environment 100 may be part of a smart home and may include a wireless-enabled microwave oven 110 and an access point (AP) 120. Optionally, environment 100 may also include one or more smart appliances, represented by smart appliances 130(1)-130(N) with N being 3 in the example shown in FIG. 1. In actual implementations, N may be any positive integer. Each of wireless-enabled microwave oven 110 and smart appliances 130(1)-130(N) may be capable of wirelessly transmitting and receiving data according to one or more wireless communication protocols such as, for example, WiFi, Bluetooth and/or BLE. For instance, each of wireless-enabled microwave oven 110 and smart appliances 130(1)-130(N) may be capable of wirelessly transmitting data to AP 120 and receiving data from AP 120 in accordance with WiFi protocol(s). For illustrative purposes and without limitation, smart appliance 130(1) may be a smart refrigerator, smart appliance 130(2) may be a smart rice cooker, and smart appliance 130(3) may be a smart television. For simplicity, the following description is provided in the context of WiFi although it is also applicable to Bluetooth, BLE and any other suitable wireless communication protocols.

When wireless-enabled microwave oven 110 is in operation at less than 100% of its full power, its magnetron may be cycled on and off. During an "off" or power-off period of a duty cycle, the magnetron is turned off and, thus, there would be no RF interference with the WiFi operation of a WiFi transceiver in a magnetron controller of wireless-enabled microwave oven 110. However, during "on" or power-on periods of the duty cycle of the magnetron, there may be interference with the WiFi reception of the WiFi transceiver of the magnetron controller of wireless-enabled microwave oven 110.

Under a proposed scheme in accordance with the present disclosure, a duty cycle of the magnetron of wireless-enabled microwave oven 110 may be synchronized with the transmit (TX)/receive (RX) windows of the WiFi operation of the WiFi transceiver of wireless-enabled microwave oven 110. That is, under the proposed scheme, the WiFi transceiver may be connected to an input of the magnetron controller of the magnetron (e.g., via a general-purpose input/output (GPIO) connection) to synchronize power-off periods of the duty cycle of the magnetron with TX/RX windows of the WiFi transceiver. For instance, to enable co-existence of WiFi operation and microwave oven operation while avoiding or otherwise minimizing interference, packet traffic arbitration (PTA) may be utilized to control operation of the magnetron of microwave oven 110 (e.g., by time-division duplexing (TDD)) to avoid or otherwise minimize interference on WiFi operation by radiation from the magnetron. That is, in the same frequency band (e.g., 2.4 GHz), some time slots may be allocated for WiFi operation while other time slots may be allocated for magnetron operation.

Under a proposed scheme in accordance with the present disclosure, various options in the WiFi protocol(s) in accordance with the IEEE specifications may be utilized so that above-described interference may be eliminated or otherwise minimized. For instance, when a WiFi client (e.g., each of wireless-enabled microwave oven 110 and smart appliances 130(1)-130(N)) is capable of entering a power-save (PS) mode from a normal operating mode in accordance with a WiFi protocol, AP 120 may utilize a delivery traffic indication map (DTIM) to inform the WiFi client about presence of multicast/broadcast data packets that are destined for the WiFi client and buffered at AP 120. Specifically, a DTIM number may indicate to the WiFi client (e.g., wireless-enabled microwave oven 110) a number of beacon periods during which the WiFi client can remain in the PS mode and not listen (e.g., with the wireless transceiver disabled or powered off). Accordingly, with the DTIM number set to inform wireless-enabled microwave oven 110 that it can expect to receive a message every given number of milliseconds (msec) (e.g., 100 msec), the magnetron controller of wireless-enabled microwave oven 110 may turn off the magnetron of wireless-enabled microwave oven 110 during a time for receiving the message so as to eliminate the source of interference.

It is noteworthy that the proposed scheme may be extended to other types of devices (e.g., smart appliances 130(1)-130(N)) as well as an unlimited number of devices in the smart home. For example, smart rice cooker 130(2) may be synchronized with wireless-enabled microwave oven 110 so that interruption of WiFi communications from smart rice cooker 130(2) may be avoided even though smart rice cooker 130(2) does not have direct control of the magnetron of wireless-enabled microwave oven 110. As another example, synchronization may be extended to other types of devices, such as phones operating in the 2.4 GHz frequency and Bluetooth devices, which may be susceptible to interference from the magnetron of wireless-enabled microwave oven 110.

Under a proposed scheme in accordance with the present disclosure, the WiFi transceiver of wireless-enabled microwave oven 110 may request AP 120 to transmit a clear-to-send (CTS) frame indicating a duration of channel quiet time or channel quiet period, with a receiver address (RA) in the CTS frame being that of wireless-enabled microwave oven 110 itself. Accordingly, upon receiving the CTS frame, other wireless-enabled devices and/or smart appliances 130(1)-130(N) in the vicinity of wireless-enabled microwave oven 110 may be informed of the channel quiet period during which the magnetron of wireless-enabled microwave oven 110 may operate, and thus may refrain from operating (e.g., in the 2.4 GHz channel) during that time to avoid interference from the magnetron of wireless-enabled microwave oven 110.

Under a proposed scheme in accordance with the present disclosure, either or both of the WiFi transceiver and magnetron of wireless-enabled microwave oven 110 may be controlled. For instance, transmission by the WiFi transceiver and/or radiation of the magnetron may be controlled (e.g., turned on or off) dynamically based on detection of wireless operation by other device(s) such as smart appliances 130(1)-130(3).

Figure 2:
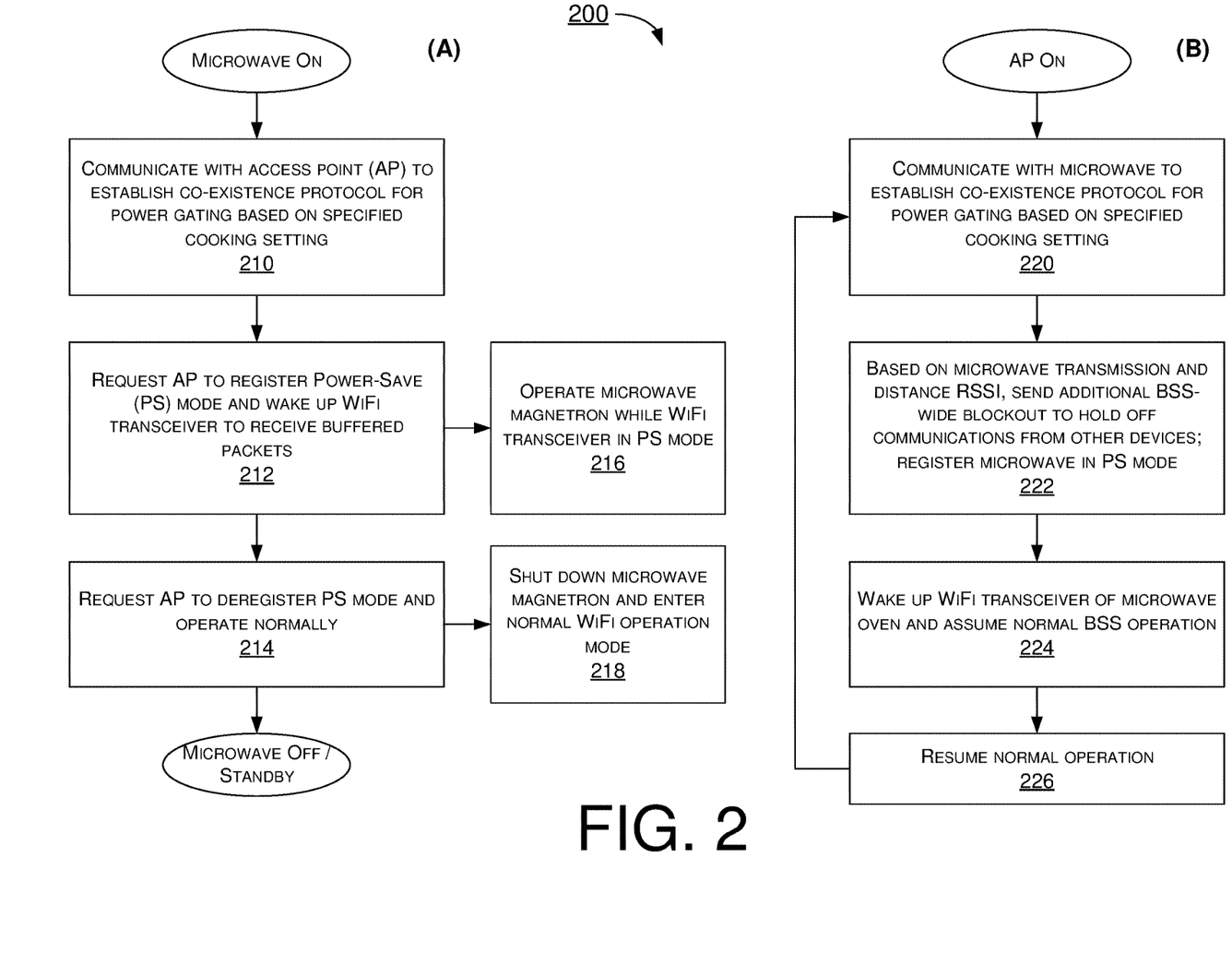
FIG. 2 is a diagram of an example scenario in accordance with an implementation of the present disclosure.

FIG. 2 illustrates an example scenario 200 of avoidance of interference between wireless operation and microwave oven operation in accordance with an implementation of the present disclosure. Part (A) of FIG. 2 shows an aspect from wireless-enabled microwave oven 110, as represented by operations 210, 212, 214, 216 and 218. Part (B) of FIG. 2 shows an aspect from AP 120, as represented by operations 220, 222, 224 and 226.

Referring to part (A) of FIG. 2, operations of wireless-enabled microwave oven 110 may start at 210.

At 210, wireless-enabled microwave oven 110 may communicate with AP 120 to establish a co-existence protocol for power gating based on specified cooking setting. The operations of wireless-enabled microwave oven 110 may proceed from 210 to 212.

At 212, wireless-enabled microwave oven 110 may request AP 120 to register wireless-enabled microwave oven 110 in power-save (PS) mode and wake up WiFi transceiver of wireless-enabled microwave oven 110 to receive data packets buffered at AP 120. The operations of wireless-enabled microwave oven 110 may proceed from 212 to 214 or 216.

At 214, wireless-enabled microwave oven 110 may request AP 120 to deregister wireless-enabled microwave oven 110 from PS mode. The operations of wireless-enabled microwave oven 110 may proceed from 214 to 218 or to a state in which wireless-enabled microwave oven 110 is powered off or in standby.

At 216, wireless-enabled microwave oven 110 may operate its microwave magnetron while its WiFi transceiver is in PS mode.

At 218, wireless-enabled microwave oven 110 may shut down or power off its microwave magnetron and enter a normal operating mode.

Referring to part (B) of FIG. 2, operations of AP 120 may start at 220.

At 220, AP 120 may communicate with wireless-enabled microwave oven 110 to establish a co-existence protocol for power gating based on specified cooking setting. The operations of AP 120 may proceed from 220 to 222.

At 222, based on microwave transmission and distance received signal strength indicator (RSSI), AP 120 may transmit additional basic service set (BSS)-wide blockout. For instance, AP 120 may transmit a clear-to-send (CTS) frame which is addressed to itself or wireless-enabled microwave oven 110. Upon receiving the CTS, each of wireless-enabled microwave oven 110 and smart appliances 130(1)-130(N) may refrain from WiFi operations by holding off communications. AP 120 may also register wireless-enabled microwave oven 110 as being in the PS mode. The operations of AP 120 may proceed from 222 to 224.

At 224, AP 120 may wake up the WiFi transceiver of wireless-enabled microwave oven 110 and assume normal BSS operation. The operations of AP 120 may proceed from 224 to 226.

At 226, AP 120 may resume normal operation. The operations of AP 120 may proceed from 226 to 220.

Illustrative Implementations

Figure 3:
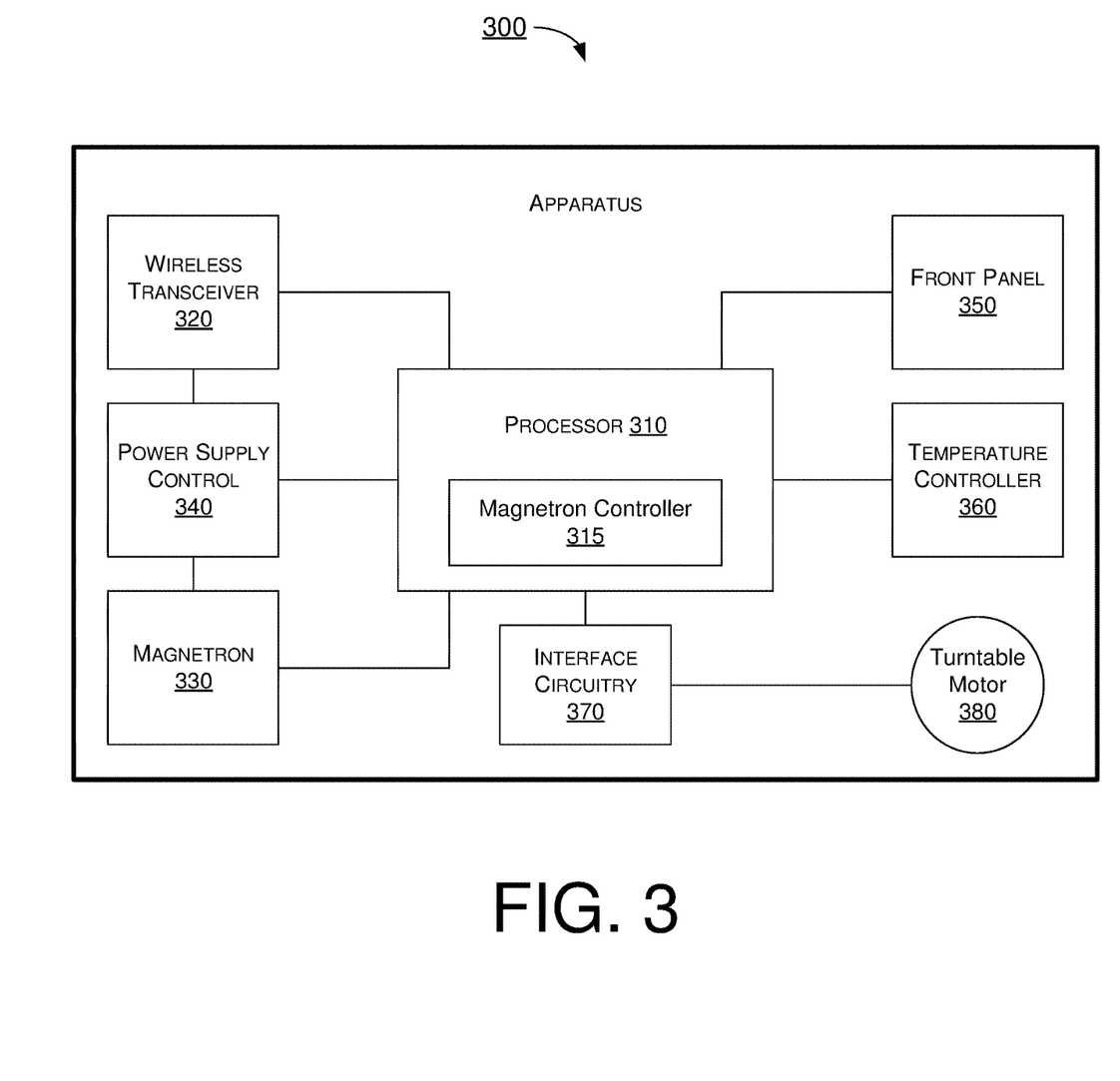
FIG. 3 is a simplified block diagram of an example apparatus in accordance with an implementation of the present disclosure.

FIG. 3 illustrates an example apparatus 300 in accordance with an implementation of the present disclosure. Apparatus 300 may perform various functions to implement schemes, techniques, processes and methods described herein pertaining to avoidance of interference between wireless operation and microwave oven operation, including those described above with respect to FIG. 1 and FIG. 2 as well as process 400 described below. Apparatus 300 may be a part of an electronic apparatus, which may be a wireless communication device, a computing apparatus, a portable or mobile apparatus, or a wearable apparatus. For instance, apparatus 300 may be implemented in or as wireless-enabled microwave oven 110. Alternatively, apparatus 300 may be implemented in the form of one or more integrated-circuit (IC) chips such as, for example and not limited to, one or more single-core processors, one or more multi-core processors, or one or more complex-instruction-set-computing (CISC) processors.

In the context of a wireless-enabled microwave oven, apparatus 300 may include one or more of the components shown in FIG. 3, such as a processor 310, a wireless transceiver 320, a microwave magnetron 330, a power supply control 340, a front panel 350, a temperature controller 360, an interface circuitry 370 and a turntable motor 380.

Wireless transceiver 320 may be capable of wireless communications in accordance with one or more wireless protocols such as the IEEE 802.11 specifications and/or any applicable wireless protocols and standards. For instance, wireless transceiver 320 may include a WiFi transceiver that is capable of wireless communication in the 2.4 GHz and/or 5 GHz frequency band(s). Microwave magnetron 330 may be capable of emitting microwave radiation for microwave operation (e.g., heating food). Power supply control 340 may be capable of receiving alternating-current (AC) power from AC mains and convert the AC power to direct-current (DC) power and power various components of apparatus 300 such as processor 310, wireless transceiver 320 and microwave magnetron 330. Front panel 350 may be capable of user interface to receive user input (e.g., via a touch pad) from a user and display information to the user. Temperature controller 360 may be capable of controlling a temperature according to a configuration by processor 310. Interface circuitry 370 may be capable of controlling or otherwise turning on and off turntable motor to spin or stop spinning a turntable.

Processor 310 may be implemented in the form of one or more single-core processors, one or more multi-core processors, or one or more CISC processors. That is, processor 310 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 310 is a special-purpose machine specifically designed, built and configured to perform specific tasks pertaining to avoidance of interference between wireless operation and microwave oven operation in accordance with the present disclosure. For example, processor 310 may include a magnetron controller 315 capable of controlling operations of microwave magnetron 330 in accordance with various proposed schemes in accordance with the present disclosure.

Under various proposed schemes in accordance with the present disclosure, processor 310 may configure at least one of magnetron 330 or wireless transceiver 320. Moreover, processor 310 may control operations of magnetron 330 and wireless transceiver 310 such that wireless communication by wireless transceiver 310 is not interfered by radiation from magnetron 330 as a result of the configuring.

In some implementations, in controlling the operations of magnetron 330 and wireless transceiver 310, processor 310 may synchronize a duty cycle of magnetron 330 with a window of time of wireless communication by wireless transceiver 310 such that wireless transceiver 310 wirelessly transmits or receives data packets during a power-off period of the duty cycle of magnetron 330.

In some implementations, in controlling the operations of magnetron 330 and wireless transceiver 310, processor 310 may synchronize a duty cycle of magnetron 330 with a window of time of wireless communication by wireless transceiver 310 such that magnetron 330 is powered on when wireless transceiver 310 is in a power-save mode and that magnetron 330 is powered off when wireless transceiver 310 is in a normal operating mode.

In some implementations, in controlling the operations of magnetron 330 and wireless transceiver 310, processor 310 may control operations of magnetron 330 and wireless transceiver 310 by time-division duplexing (TDD).

In some implementations, in configuring at least one of magnetron 330 or wireless transceiver 310, processor 310 may perform some operations. For instance, processor 310 may transmit, via wireless transceiver 320, a request to AP 120 for a clear-to-send (CTS) frame indicating a channel quiet period and with a receiver address being that of AP 120 or wireless transceiver 310. Additionally, processor 310 may receive, via wireless transceiver 320, the CTS frame from AP 120. In some implementations, in controlling the operations of magnetron 330 and wireless transceiver 310, responsive to receiving the CTS, processor 310 may power on magnetron 330 during the channel quiet period with wireless transceiver 310 not receiving or transmitting during the channel quiet period.

In some implementations, in configuring at least one of magnetron 330 or wireless transceiver 310, processor 310 may receive, via wireless transceiver 320, a delivery traffic indication map (DTIM) from AP 120. In such cases, the DTIM may indicate presence of one or more buffered data packets destined for wireless transceiver 310. Moreover, the DTIM may also indicate a number of one or more beacon periods during which wireless transceiver 310 can remain in the PS mode.

In some implementations, in controlling the operations of magnetron 330 and wireless transceiver 310, processor 310 may perform some operations. For instance, processor 310 may switch wireless transceiver 310 from the PS mode to the normal operating mode to receive the one or more buffered data packets during the one or more beacon periods. Moreover, processor 310 may power off magnetron 330 during the one or more beacon periods. In some implementations, in controlling the operations of magnetron 330 and wireless transceiver 310, processor 310 may perform additional operations. For instance, processor 310 may switch wireless transceiver 310 from the normal operating mode to the PS mode during a channel quiet period other than the one or more beacon periods. Furthermore, processor 310 may power on magnetron 330 during the channel quiet period.

In some implementations, wireless transceiver 310 may include a WiFi transceiver capable of wireless communications in accordance with IEEE 802.11 specifications, Bluetooth or BLE.

Illustrative Processes

Figure 4:
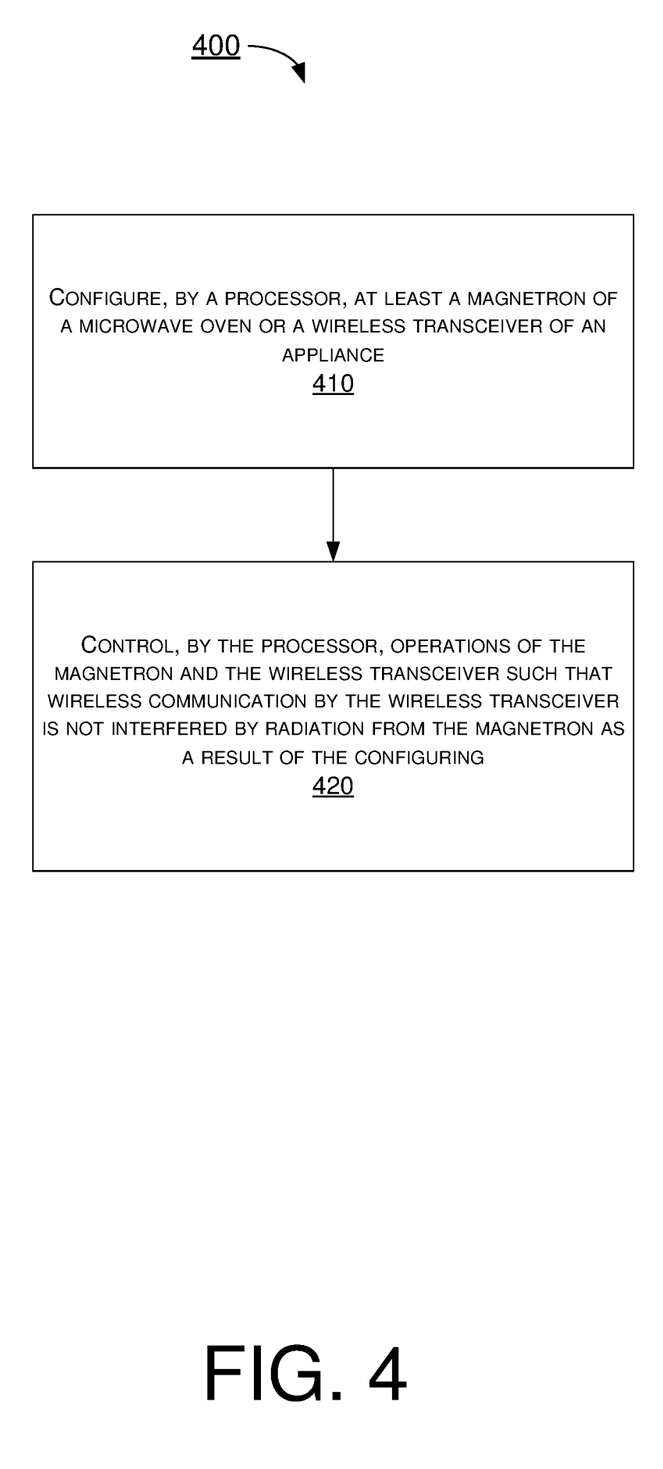
FIG. 4 is a flowchart of an example process in accordance with an implementation of the present disclosure.

FIG. 4 illustrates an example process 400 in accordance with an implementation of the present disclosure. Process 400 may be an example implementation of various schemes, techniques, processes and methods described herein pertaining to avoidance of interference between wireless operation and microwave oven operation, including those described above with respect to FIG. 1, FIG. 2 and FIG. 3. Process 400 may represent an aspect of implementation of features of apparatus 300. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively in a different order. Process 400 may be implemented by apparatus 300 and any variations and/or derivatives thereof. Solely for illustrative purposes, process 400 is described below in the context of apparatus 300 being implemented as wireless-enabled microwave oven 110 in environment 100. Process 400 may begin at block 410.

At 410, process 400 may involve processor 310 of apparatus 300 configuring at least one of magnetron 330 or wireless transceiver 320. Process 400 may proceed from 410 to 420.

At 420, process 400 may involve processor 310 controlling operations of magnetron 330 and wireless transceiver 310 such that wireless communication by wireless transceiver 310 is not interfered by radiation from magnetron 330 as a result of the configuring.

In some implementations, in controlling the operations of magnetron 330 and wireless transceiver 310, process 400 may involve processor 310 synchronizing a duty cycle of magnetron 330 with a window of time of wireless communication by wireless transceiver 310 such that wireless transceiver 310 wirelessly transmits or receives data packets during a power-off period of the duty cycle of magnetron 330.

In some implementations, in controlling the operations of magnetron 330 and wireless transceiver 310, process 400 may involve processor 310 synchronizing a duty cycle of magnetron 330 with a window of time of wireless communication by wireless transceiver 310 such that magnetron 330 is powered on when wireless transceiver 310 is in a power-save mode and that magnetron 330 is powered off when wireless transceiver 310 is in a normal operating mode.

In some implementations, in controlling the operations of magnetron 330 and wireless transceiver 310, process 400 may involve processor 310 controlling operations of magnetron 330 and wireless transceiver 310 by time-division duplexing (TDD).

In some implementations, in configuring at least one of magnetron 330 or wireless transceiver 310, process 400 may involve processor 310 performing some operations. For instance, process 400 may involve processor 310 transmitting a request to AP 120 for a clear-to-send (CTS) frame indicating a channel quiet period and with a receiver address being that of AP 120 or wireless transceiver 310. Additionally, process 400 may involve processor 310 receiving the CTS frame from AP 120. In some implementations, in controlling the operations of magnetron 330 and wireless transceiver 310, responsive to receiving the CTS, process 400 may involve processor 310 powering on magnetron 330 during the channel quiet period with wireless transceiver 310 not receiving or transmitting during the channel quiet period.

In some implementations, in configuring at least one of magnetron 330 or wireless transceiver 310, process 400 may involve processor 310 receiving a delivery traffic indication map (DTIM) from AP 120. In such cases, the DTIM may indicate presence of one or more buffered data packets destined for wireless transceiver 310. Moreover, the DTIM may also indicate a number of one or more beacon periods during which wireless transceiver 310 can remain in the PS mode.

In some implementations, in controlling the operations of magnetron 330 and wireless transceiver 310, process 400 may involve processor 310 performing some operations. For instance, process 400 may involve processor 310 switching wireless transceiver 310 from the PS mode to the normal operating mode to receive the one or more buffered data packets during the one or more beacon periods. Moreover, process 400 may involve processor 310 powering off magnetron 330 during the one or more beacon periods. In some implementations, in controlling the operations of magnetron 330 and wireless transceiver 310, process 400 may involve processor 310 performing additional operations. For instance, process 400 may involve processor 310 switching wireless transceiver 310 from the normal operating mode to the PS mode during a channel quiet period other than the one or more beacon periods. Furthermore, process 400 may involve processor 310 powering on magnetron 330 during the channel quiet period.

In some implementations, wireless transceiver 310 may include a WiFi transceiver capable of wireless communications in accordance with IEEE 802.11 specifications, Bluetooth or BLE.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
configuring, by a processor, at least one of a magnetron of a microwave oven or a wireless transceiver of the microwave oven; and
controlling, by the processor, operations of the magnetron and the wireless transceiver to result in wireless communication by the wireless transceiver being not interfered by radiation from the magnetron as a result of the configuring,
wherein the configuring of at least one of the magnetron or the wireless transceiver comprises:
communicating with an access point (AP) to establish a co-existence protocol for power gating based on a cooking setting; and receiving a basic service set (BSS)-wide blockout based on microwave transmission by the magnetron of the microwave oven and a distance received signal strength indicator (RSSI), wherein the controlling of the operations of the magnetron and the wireless transceiver comprises synchronizing a duty cycle of the magnetron with a window of time of wireless communication by the wireless transceiver to cause the wireless transceiver to wirelessly transmit or receive data packets during a power-off period of the duty cycle of the magnetron.

2. The method of claim 1, wherein the controlling of the operations of the magnetron and the wireless transceiver comprises synchronizing a duty cycle of the magnetron with a window of time of wireless communication by the wireless transceiver to cause the magnetron to be powered on when the wireless transceiver is in a power-save mode and that the magnetron is powered off when the wireless transceiver is in a normal operating mode.

3. The method of claim 1, wherein the controlling of the operations of the magnetron and the wireless transceiver comprises controlling operations of the magnetron and the wireless transceiver by time-division duplexing (TDD).

4. The method of claim 1, wherein the configuring of at least one of the magnetron or the wireless transceiver further comprises:
transmitting a request to the AP for a clear-to-send (CTS) frame indicating a channel quiet period and with a receiver address being that of the AP or the wireless transceiver; and
receiving the CTS frame from the AP.

5. The method of claim 4, wherein the controlling of the operations of the magnetron and the wireless transceiver comprises, responsive to receiving the CTS, powering on the magnetron during the channel quiet period with the wireless transceiver not receiving or transmitting during the channel quiet period.

6. The method of claim 1, wherein the configuring of at least one of the magnetron or the wireless transceiver further comprises receiving a delivery traffic indication map (DTIM) from the AP, wherein the DTIM indicates presence of one or more buffered data packets destined for the wireless transceiver, and wherein the DTIM also indicates a number of one or more beacon periods during which the wireless transceiver can remain in a power-save (PS) mode.

7. The method of claim 6, wherein the controlling of the operations of the magnetron and the wireless transceiver comprises:
switching the wireless transceiver from the PS mode to a normal operating mode to receive the one or more buffered data packets during the one or more beacon periods; and
powering off the magnetron during the one or more beacon periods.

8. The method of claim 7, wherein the controlling of the operations of the magnetron and the wireless transceiver further comprises:
switching the wireless transceiver from the normal operating mode to the PS mode during a channel quiet period other than the one or more beacon periods; and
powering on the magnetron during the channel quiet period.

9. The method of claim 1, wherein the wireless transceiver comprises a WiFi transceiver capable of wireless communications in accordance with Institute of Electrical and Electronic Engineers (IEEE) 802.11 specifications, Bluetooth or Bluetooth Low Energy (BLE).

10. An apparatus implementable in an appliance, comprising:
a wireless transceiver which, during operation, wirelessly transmits and receives data; and a processor coupled to the wireless transceiver and, during operation, the processor performs operations comprising:
configuring at least one of a magnetron of a microwave oven or the wireless transceiver; and
controlling operations of the magnetron and the wireless transceiver to result in wireless communication by the wireless transceiver being not interfered by radiation from the magnetron as a result of the configuring,
wherein, in configuring at least one of the magnetron or the wireless transceiver, the processor performs operations comprising: communicating, via the wireless transceiver, with an access point (AP) to establish a co-existence protocol for power gating based on a cooking setting; and receiving, via the wireless transceiver, a basic service set (BSS)-wide blockout based on microwave transmission by the magnetron of the microwave oven and a distance received signal strength indicator (RSSI), wherein, in controlling the operations of the magnetron and the wireless transceiver, the processor synchronizes a duty cycle of the magnetron with a window of time of wireless communication by the wireless transceiver to cause the wireless transceiver to wirelessly transmit or receive data packets during a power-off period of the duty cycle of the magnetron.

11. The apparatus of claim 10, wherein, in controlling the operations of the magnetron and the wireless transceiver, the processor synchronizes a duty cycle of the magnetron with a window of time of wireless communication by the wireless transceiver to cause the magnetron to be powered on when the wireless transceiver is in a power-save mode and that the magnetron is powered off when the wireless transceiver is in a normal operating mode.

12. The apparatus of claim 10, wherein, in controlling the operations of the magnetron and the wireless transceiver, the processor controls operations of the magnetron and the wireless transceiver by time-division duplexing (TDD).

13. The apparatus of claim 10, wherein, in configuring at least one of the magnetron or the wireless transceiver, the processor further performs operations comprising:
transmitting, via the wireless transceiver, a request to the AP for a clear-to-send (CTS) frame indicating a channel quiet period and with a receiver address being that of the AP or the wireless transceiver; and
receiving, via the wireless transceiver, the CTS frame from the AP,
wherein, in controlling the operations of the magnetron and the wireless transceiver, responsive to receiving the CTS, the processor powers on the magnetron during the channel quiet period with the wireless transceiver not receiving or transmitting during the channel quiet period.

14. The apparatus of claim 10, wherein, in configuring at least one of the magnetron or the wireless transceiver, the processor further receives, via the wireless transceiver, a delivery traffic indication map (DTIM) from the AP, wherein the DTIM indicates presence of one or more buffered data packets destined for the wireless transceiver, and wherein the DTIM also indicates a number of one or more beacon periods during which the wireless transceiver can remain in a power-save (PS) mode.

15. The apparatus of claim 14, wherein, in controlling the operations of the magnetron and the wireless transceiver, the processor performs operations comprising:
switching the wireless transceiver from the PS mode to a normal operating mode to receive the one or more buffered data packets during the one or more beacon periods; and
powering off the magnetron during the one or more beacon periods,
wherein, in controlling the operations of the magnetron and the wireless transceiver, the processor further performs operations comprising:
switching the wireless transceiver from the normal operating mode to the PS mode during a channel quiet period other than the one or more beacon periods; and
powering on the magnetron during the channel quiet period.

16. The apparatus of claim 15, wherein the wireless transceiver comprises a WiFi transceiver capable of wireless communications in accordance with institute of Electrical and Electronic Engineers (IEEE) 802.11 specifications, Bluetooth or Bluetooth Low Energy (BLE).

\* \* \* \* \*